March 15, 1966
L. D. HAGENBOOK
3,239,901
CLAMPING ASSEMBLY
Filed Jan. 18, 1963
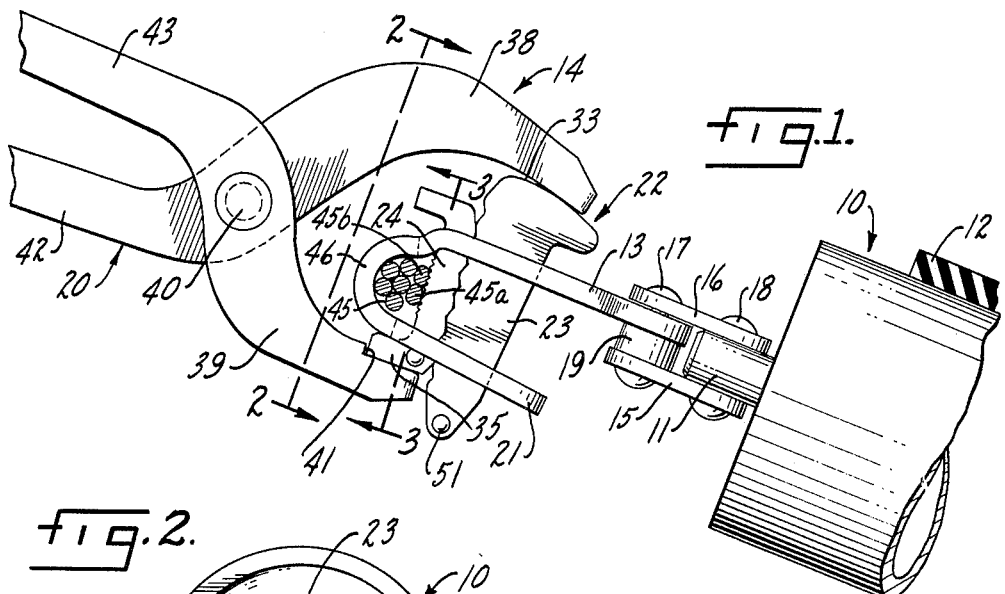
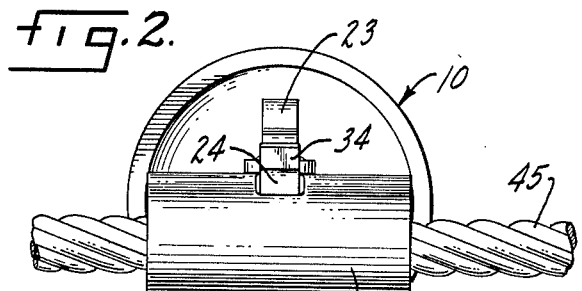
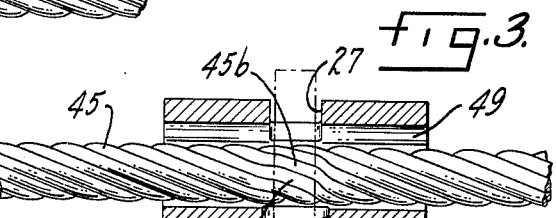
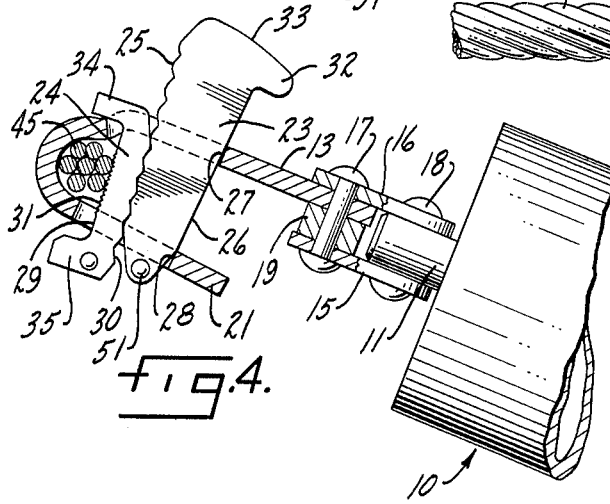
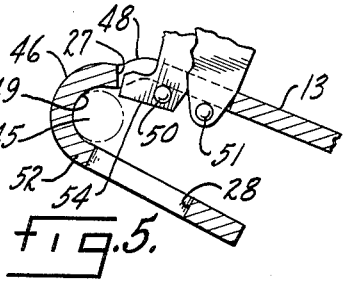
INVENTOR.
Loy D. Hagenbook,
BY Parker & Carter
Attorneys.

United States Patent Office 3,239,901
Patented Mar. 15, 1966

3,239,901
CLAMPING ASSEMBLY
Loy D. Hagenbook, Chicago, Ill., assignor to Goodman Manufacturing Company, Chicago, Ill., a corporation of Illinois
Filed Jan. 18, 1963, Ser. No. 252,509
7 Claims. (Cl. 24—126)

This invention relates generally to clamping structures and specifically to a clamp assembly especially useful for securing a roller assembly to a wire rope.

Wedge type rope clamps have been widely used in the installation of idler assembles in wire rope side frame conveyors because of the ease with which such clamps can be installed. A rope clamp may include a generally U-shaped member, the outwardly extending arms of the U-shaped member forming a bight within which the rope is received, and a wedge. The wedge passes through a pair of aligned apertures in the arms, or flaps, forming the U-shaped member, and is seated with several sharp blows. The tapered sides of the wedge press the rope against the bight or back wall of the U-shaped member.

Experience has shown, however, that the wedge is inclined to occasionally work loose, especially in heavy duty applications. It is thought this is largely due to a reaction of the wire ropes working against the wedge. When the wedge is driven down in the clamp, it may twist the wire rope slightly. The further the wedge is driven downward the greater the twisting of the rope, and eventually several strands of the rope may be deformed downwardly. Downward deformation of several rope strands produces a high torsional load or force which tends to recoil against the wedge. That is, the torsional force exerted by the deformed rope strands against the wedge acts in a direction which tends to move the wedge out of engagement with the wire rope.

Should one of the wedges holding a clamp to the rope become loose the roller assembly which is connected to the clamp may slip downstream. This results in detraining of the conveyor belt, because the alignment of the belt on the roller assembly depends, to a considerable degree, upon the angle between the roller assembly and the belt. That is, when the roller assembly is oriented perpendicularly to the direction of belt travel, the belt tends to stay centered on the roller assembly. When the roller assembly is canted from the perpendicular to the direction of belt travel, then the roller assembly tends to impart a detraining force to the belt.

Heretofore, in attempting to keep the wedges from coming loose, it has been common practice to drive them down to an extreme degree. This may cause an even greater deformation of the rope and may result eventually in damage to the rope.

Accordingly, a primary object of this invention is to eleminate any recoil tendency of the rope against a wedge which will tend to unseat the wedge.

Another object is to provide structure for imposing a torsional load on the wire rope which acts in a direction opposite to the unseating tendency of the rope, thereby providing a force which will tend to draw the wedge tighter.

A further object is to provide a wedge assembly for use with rope clamps which eliminates the tendency of the rope to work loose with all the ensuing disadvantages, including rope deformation.

A further object is to provide a wedge assembly which, when installed, imparts a torsional force to the active clamping members in a rope tightening direction.

A still further object is to provide a wedge assembly in which the conventional recoil effect tending to loosen the clamp, which is present in many conventional rope clamps, is eliminated.

Yet a further object is to provide wedge means which can be installed by conventional methods or with a special member cooperable with the wedge means.

Yet another object is to provide a method of installing a wedge which eliminates any recoil tendency of the wire rope.

A further object is to provide a method of installing a wedge which not only eliminates any recoil tendency of the wire but imparts a tightening force which is exerted in a direction opposite to the direction of movement of the wedge when it is loosened.

Other objects and advantages of the invention will become apparent upon a following reading of the description.

The invention is illustrated more or less diagrammatically in the accompanying figures wherein:

FIGURE 1 is a side elevation, partly in section, and with parts omitted for clarity, of a first embodiment of the invention;

FIGURE 2 is a view taken substantially along the line 2—2 of FIGURE 1;

FIGURE 3 is a view taken substantially along the line 3—3 of FIGURE 1, with parts omitted and others indicated in dotted lines for clarity;

FIGURE 4 is a view of the wedge means of FIGURE 1 at the start of installation; and FIGURE 5 is a sectional view illustrating the clearance provided between the wire rope and the wedge means when the wedge means is povided with extensions for securement to the rope clamp.

Like reference numerals will be used to refer to like parts throughout the following description of the drawings.

The outer end of a wing roller is indicated generally at 10 in FIGURE 1. The roller is supported on a dead shaft 11 and supports a conveyor belt 12. Since the particular type of roller assembly is not an integral part of the invention, it has not been further illustrated or described. For a more complete disclosure of a roller assembly of the type with which the unique rope clamp of this application may be utilized, reference is made to the Craggs et al. Patent 2,773,257.

The outer end of wing roller shaft 11 is connected to an outwardly extending portion 13 of a rope clamp indicated generally at 14. In this instance, the connection has been made by a pair of links 15, 16, the ends of which are secured to the extending portion 13 and shaft 11 by pins 17, 18. A suitable spacer or spacers is indicated at 19.

The rope clamp 14 comprises a force applicator 20, a rope receiving member 21 and wedge means 22.

The wedge means 22 includes a wedge 23 and a fitting 24. The wedge has a pair of opposed bearing surfaces 25 and 26, best seen in FIGURE 4. The outer bearing surface 25 has a high coefficient of friction. In this instance, the surface has been formed with a series of corrugations or shallow notches. It should be understood, however, that within the scope of the invention, any suitable high-friction surface may be utilized. The rear or inner bearing surface 26 by way of contrast is relatively smooth so as to enable it to slide readily along the inner edges of apertures 27 and 28 in the rope receiving member 21. The fitting member similarly has a pair of opposed bearing surfaces 29, 30, best seen in FIGURE 4. The inner bearing surface 30 is formed with a high coefficient of friction and preferably the surface is complementary to the abutting surface 25 on the wedge 23. In this instance a plurality of shallow corrugations or shallow notches have been formed on inner bearing surface 30 which, as best seen in FIGURES 1 and 4, are complementary to the corrugations or notches on the wedge. Again, however, within the scope of the invention, any suitable high friction surface may be provided between these two abutting bearing surfaces. The outer bearing surface 31 of fitting 24 is also formed with a high coefficient of friction. In this instance, the surface has been roughened by knurling, sand-blasting, or other equivalent means.

The upper end of the wedge has an inwardly extending lip 32 which provides a relatively long impact-receiving surface 33 and a purchase which enables the wedge to be removed. The upper and lower ends of the fitting 24 terminate in outwardly directed flanges 34 and 35. As best seen in FIGURE 4, the flanges 34 and 35 extend outwardly a distance sufficient to overlie the edge of the apertures formed in the rope-receiving member 21.

In this instance, the wedge 23 has been formed with a slight taper. It is quite within the scope of the invention, however, to form the wedge with relatively parallel sides and the fitting member with the taper if environmental conditions, or installation, requirements so dictate.

The force applicator consists of a pair of force applying members 38, 39 which are pivoted as at 40. Lower member 39 has a recess 41 formed in its leading edge against which the lower flange 35 of fitting 24 is seated when the applicator is in use. The upper arm 38 is considerably longer than the lower arm and extends forwardly far enough to make contact with the impact surface 33 of the wedge. The force applying members 38, 39 terminate in handles or levers 42, 43, respectively, of any desired length. It will be understood that by applying opening and closing forces to the free ends of the members 38, 39, with the recess 41 in abutting engagement with 35, a tremendous wedging force is applied to the wedge means.

A wire rope which may, for example, be the side frame of a wire rope side frame conveyor, is indicated at 45. It will be noted that the individual strands are all laid in the same direction. The wire rope is received in the bight portion 46 of the rope clamp 21. The aligned apertures 27, 28 in the rope clamp are so dimensioned that the wedge means may be set aagint the wire rope 45 in the relative positions indicated in FIGURE 4. The upper leg of the rope clamp is offset as at 48 in order to enable the wire rope to slip into the seat 49 in the bight portion beneath the ends of the fitting and wedge, as shown best in FIGURE 5. Preferably, upper aperture 27 is a little narrower in width than lower aperture 28, as best seen in FIGURE 3. Projecting members 50, 51 extend outwardly from either side of the lower ends of the wedge and fitting. As best seen in FIGURE 3, lower aperture 28 is sufficiently wide to enable the wedge means to pass easily therethrough, but upper aperture 27 is narrower than the length of the pins 50, 51. As a result, the projections will prevent the wedge means from being slid through the upper aperture. At the same time, however, the offset section 48 of the rope clamp enables the fitting and wedge to be raised sufficiently high above the lower limb 52 that the wire rope may be slid past the wedge means into seating position prior to setting the wedge means.

The use and operation of the invention is as follows:

To connect the outer end of a roller assembly to a wire rope side frame 45, the rope receiving member 21 is first connected to the outer end of the roller assembly as by the link and pin means 15–18. It is then slipped over the wire rope 45. If a wedge and fitting is used which has the projections 50 and 51, the wedge and fitting will, of course, be raised to the position of FIGURE 5 in order to let the rope slide past them into the rope seat formed in bight 46. As best seen in FIGURE 5, the lower edge 54 of fitting 24 is formed with an inclined surface to facilitate movement of the wire rope past the fitting.

The fitting 24 is then slid downwardly to the position of FIGURE 4. In this position, the upper flange 34 bears against the upper edge of aperture 27.

At this point, the lower force applying member 39 is brought into engagement with the lower flange 35, as shown in FIGURE 1, and the upper force applying member, or leg 38, is laid against the impact surface 33 of the wedge. By a suitable application of force at the free end of lever handles 42, 43 the wedge is driven downwardly from the position of FIGURE 4 to FIGURE 1. At the same time the fitting 24 is moved upwardly from the position of FIGURE 4 to FIGURE 1, and the wedge downwardly from the position of FIGURE 4 to FIGURE 1.

As best seen in FIGURE 4, the individual strands of wire rope 45 are substantially undeformed at the start of the wedging action. At the end of the wedging action, the two strands 45a, 45b in engagement with the gripping surface 31 have been slightly compressed, as best seen in FIGURE 1. At the same time, these two strands have been displaced upwardly slightly, as best seen in FIGURES 1 and 3. The direction of displacement, however, is in a direction which tends to supplement the tightening effect or wedging force. That is, the individual strands 45a and 45b exert a torsional resistance in a downward direction from their positions in FIGURES 1 and 3. A downward exertion of force will, of course, tend to force the wedge means even more snugly into engagement with the wire rope and rope clamp.

Alternately, the force applicator 20 may in some circumstances be dispensed with and the wedge 23 merely hammered into place. In this event, the wedge and fitting are again placed in the position of FIGURE 4 at the start of installation and the wedge is merely driven as far downwardly as it will travel. Since the edge along the outside of aperture 27 prevents fitting 24 from sliding downwardly from the position of FIGURE 4, the strands 45a and 45b will not be moved downwardly as would be the case when a conventional downwardly moving wedge member slides past the rope. While no reverse torsion effect will be imparted to the individual strands of the rope in contact with the fitting, at least the strands will not be displaced, as often occurs in present installations.

The projections or extensions 50, 51 at the low ends of the fitting and wedge provide a handy means for handling the wedge means and rope clamp as a unit. Both the fitting and the wedge are passed upwardly through lower aperture 28 before the clamp is placed over the rope, for example at the factory. Since upper aperture 27 is shorter than the length of the pins, the fitting and wedge cannot slip upwardly and out of the upper aperture. At the same time, as soon as the fitting and wedge are threaded through the apertures, the wedge can be pressed downward by hand a distance sufficient to press the fitting into engagement against the front edges of apertures 27 and 28. Thus the clamp and wedge means may be handled as a unit. When it is desired to install the rope clamp on a wire rope, the fitting and wedge are easily slid to the relative positions of FIGURE 4 and then both are slipped past the bottom of the fitting and wedge means while they are in their FIGURE 5 position, and thereafter, the fitting, and then the wedge, are moved downwardly to the FIGURE 4 position.

To disassemble, it is only necessary to pry upwardly under the inwardly extending lip 32.

Although several embodiments of the invention have been illustrated and described, it will at once be apparent to those skilled in the art that various modifications may be made without any departing from the spirit and scope of the invention. Accordingly, it is the intention that the scope of the invention should be measured, not by the scope of the exemplary description, but solely by the scope of the appended claims when interpreted in the light of the pertinent prior art.

I claim:

1. A rope clamp assembly for connecting structures such as a troughing idler assembly to a wire rope, said rope clamp assembly including, in combination, a rope receiving member, said rope receiving member having a rope seat of a size sufficient to receive a wire rope in wedged engagement, said rope seat being formed by a pair of legs, said legs being connected together at one end by a bight portion which forms the rope seat, said legs having a pair of aligned apertures located a distance from the rope seat sufficient to provide space for a wire rope within the seat and wedge means for forcing a wire rope into snug frictional engagement with the rope seat, said wedge means passing through the apertures, said wedge means including in combination, a wedge, said wedge having a pair of opposed bearing surfaces, a fitting, said fitting having a pair of opposed bearing surfaces, at least two of said bearing surfaces being tapered, each of the fitting bearing surfaces having a high coefficient of friction, one of the wedge bearing surfaces having a high coefficient of friction whereby said one wedge bearing surface, when in abutting engagement with one of the fitting bearing surfaces, forms a high resistance to slippage between the wedge and fitting when the wedge and fitting are in abutting engagement with one another, the other fitting bearing surface is in engagement with a rope, and the other wedge bearing surface is in engagement with a rope receiving member, and means for connecting the rope receiving member to structure to be secured to the rope.

2. The rope clamp assembly of claim 1 further characterized in that one of the apertures is substantially larger than the other, and the fitting and wedge each carry extensions at corresponding ends of a size sufficient to pass through the larger aperture, but insufficient to pass through the smaller aperture, said legs being spaced apart a distance sufficient to enable a wire rope to pass between the ends of the fitting and wedge which carry extensions, and the opposite leg.

3. In a rope clamp assembly for connecting structure to a wire rope comprised of a plurality of strands layed in the same direction, said rope clamp assembly including, in combination, a rope receiving member having a rope seat therein formed and adapted to receive a rope in axially non-distorted condition, and a wedge assembly co-operable with the rope receiving member for forcing a rope into the rope seat, said wedge assembly including, in an initial unassembled condition, a fitting member and a wedge member, the fitting member having a first surface in engagement with a rope and a second surface in engagement with the wedge member, the fitting member having a length sufficient to enable it to be moved against the rope strands in a direction to create a torsional force in the deformed rope strands which acts on the wedge assembly in a direction to supplement the wedging force of the wedge assembly.

4. The rope clamp assembly of claim 3 further characterized in that the abutting surfaces of the wedge member and fitting member have generally saw tooth profiles.

5. The rope clamp assembly of claim 3 further characterized in that the fitting member carries stop means which, when in engagement with the rope receiving member, limits further movement of the fitting member with respect thereto.

6. The rope clamp assembly of claim 3 further characterized in that the rope receiving member has a pair of generally aligned apertures formed therein for the reception of the wedge assembly, one of said apertures being larger than the other of said apertures, each of said fitting member and wedge member having extension means which enable said members to pass through the larger of said apertures, but not the smaller.

7. The rope clamp assembly of claim 6 further characterized in that the apertures are formed in a pair of spaced legs of the rope receiving member, said apertures being spaced from a bight formed between the legs, said legs being spaced apart a distance sufficient to enable a wire rope to be moved past the wedge assembly and into the bight when said wedge assembly extends through one of said apertures and into the space between said legs.

References Cited by the Examiner

UNITED STATES PATENTS

| 1,183,767 | 5/1916 | Radtke | 24—25 |
|---|---|---|---|
| 1,737,091 | 11/1929 | Northey | 24—126 |
| 2,328,167 | 8/1943 | Ratigan | 24—126 |
| 2,328,866 | 9/1943 | Van Sittert et al. | 81—5.1 |
| 2,619,714 | 12/1952 | Dornaus | 29—525 |
| 2,686,963 | 8/1954 | Freyssinet | 29—525 |
| 2,903,770 | 9/1959 | Hagenbook | 24—126 |
| 2,903,771 | 9/1959 | Madeira | 24—126 |
| 2,940,147 | 6/1960 | Presti. | |
| 2,971,234 | 2/1961 | Hagenbook | 24—126 |
| 2,985,962 | 5/1961 | Shiner | 81—5.1 |
| 3,005,366 | 10/1961 | Grimshaw et al. | 81—5.1 |

FOREIGN PATENTS

| 462,568 | 7/1928 | Germany. |
|---|---|---|
| 1,006,375 | 4/1957 | Germany. |

WILLIAM FELDMAN, *Primary Examiner.*

DONLEY J. STOCKING, *Examiner.*